S. J. CLIFFORD.
PITTING MACHINE.
APPLICATION FILED JUNE 29, 1917.
1,292,261.
Patented Jan. 21, 1919.
2 SHEETS—SHEET 1.
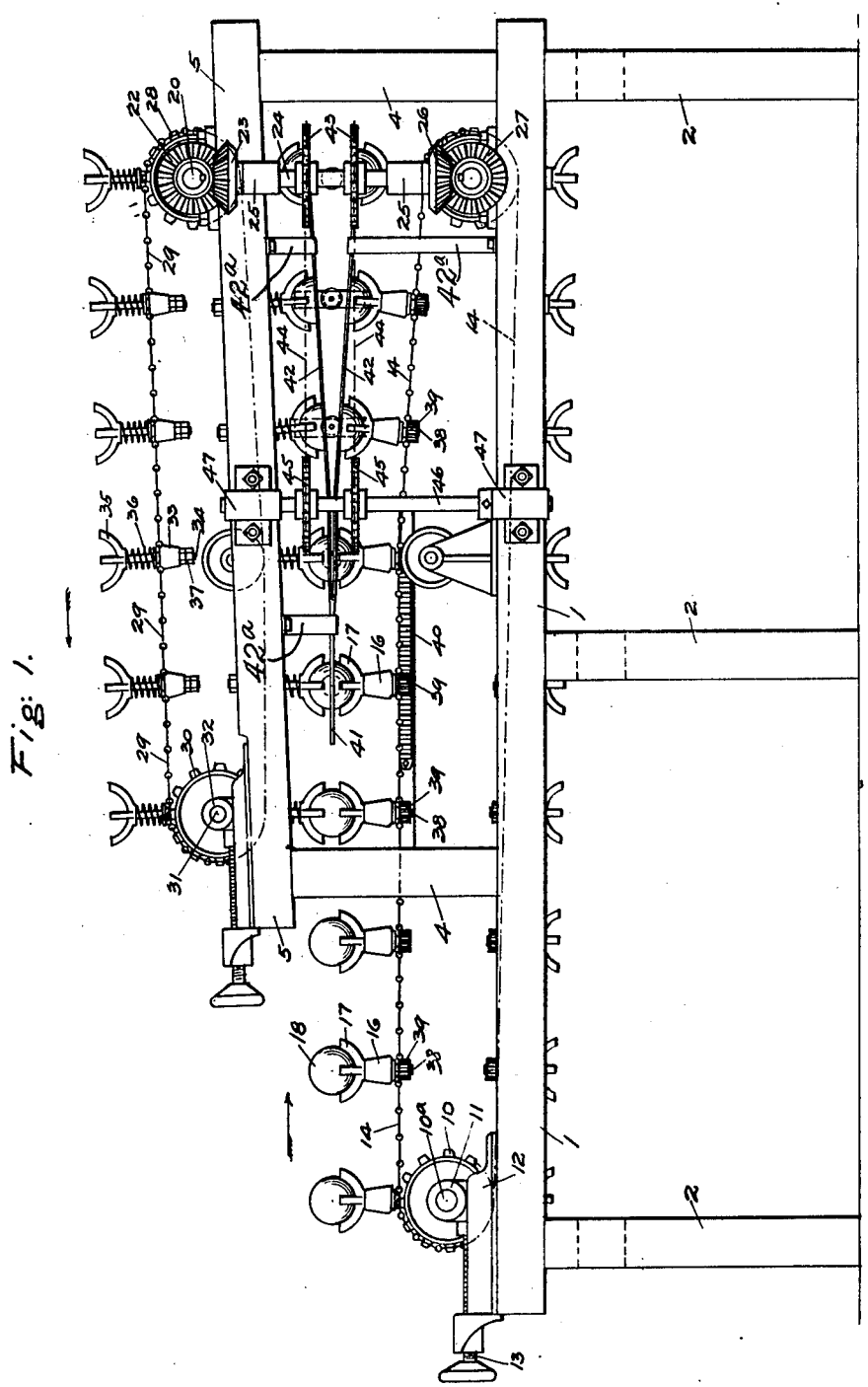

S. J. CLIFFORD.
PITTING MACHINE.
APPLICATION FILED JUNE 29, 1917.
1,292,261.
Patented Jan. 21, 1919.
2 SHEETS—SHEET 2.
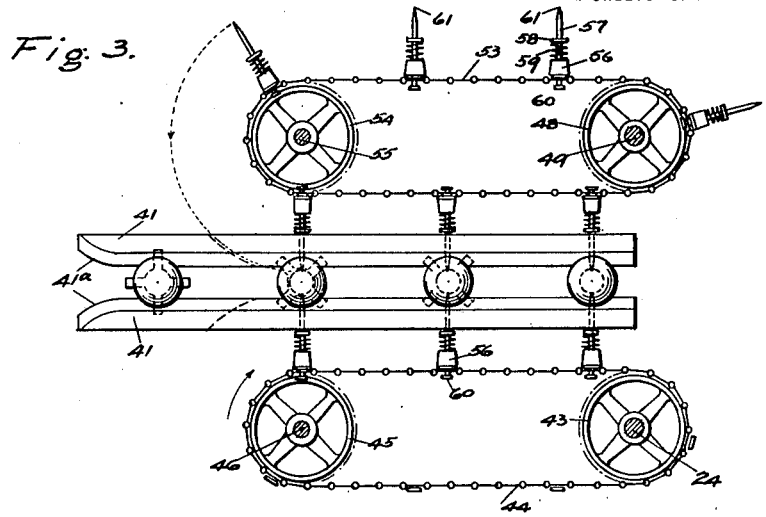
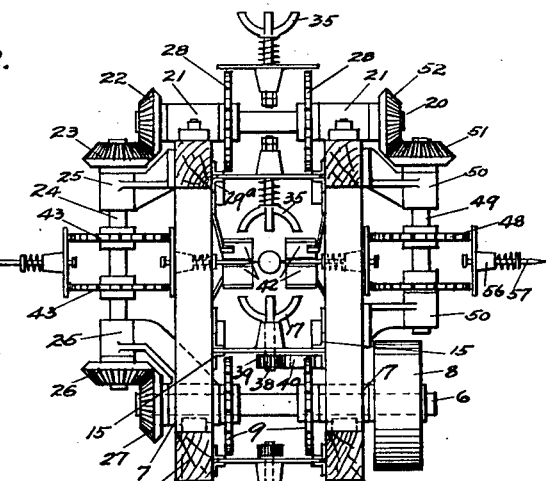
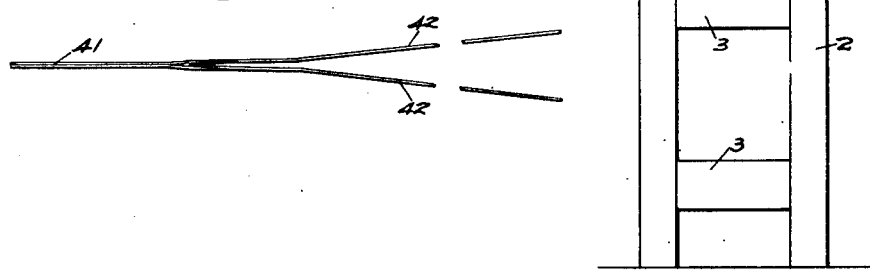

UNITED STATES PATENT OFFICE.

SAMUEL J. CLIFFORD, OF PORTLAND, OREGON, ASSIGNOR TO PACIFIC EVAPORATOR COMPANY, OF PORTLAND, OREGON, A CORPORATION OF OREGON.

PITTING-MACHINE.

1,292,261. Specification of Letters Patent. Patented Jan. 21, 1919.

Application filed June 29, 1917. Serial No. 177,717.

*To all whom it may concern:*

Be it known that I, SAMUEL J. CLIFFORD, a citizen of the United States, residing at 346 Eugene street, Portland, in the county of Multnomah and State of Oregon, have invented new and useful Improvements in Pitting-Machines, of which the following is a specification.

This invention relates to pitting machines, and consists of certain improvements in the construction thereof, as will be hereafter fully described and pointed out in the claims.

In pitting fruit, such as peaches, it is desirable to make a circular cut severing the peach, and to separate the parts so severed, in order that the pit may be forced from the part to which it clings.

It is preferable that this be done in a continuously operating machine and so effected as to mutilate the fruit as little as possible. The object of this invention is to accomplish these results, the further objects appearing from the specification and claims.

The invention as illustrated in the accompanying drawing is as follows:

Figure 1 shows side elevation of the machine;

Fig. 2 an end elevation;

Fig. 3 a plan view partly in section of a portion of the machine;

Fig. 4 a side elevation of the knife and spreader detached.

The frame has the side pieces 1, which are supported by legs 2. The sides are connected by cross pieces 3. A top frame 5 is supported by posts 4, extending upwardly from the side pieces 1.

The drive shaft 6 is journaled in bearings 7 mounted on the side pieces 1. The drive pulley 8 is fixed on shaft 6. Sprocket wheels 9 are also fixed on the shaft 6. Sprocket wheels 10 are journaled at the opposite end of the machine from the shaft 6, the sprocket wheels 10 being mounted on a shaft $10^a$. The shaft $10^a$ is journaled in the bearings 11, and the bearings 11 are slidingly mounted on the brackets 12, the brackets being secured to the side pieces 1. The bearings 11 may be adjusted by the screw 13 so as to tighten the carrier chain 14. The carrier chain 14 runs over the sprockets 9 to the sprockets 10. The carrier 14 travels between the guides 15, the guides being in the form of angle irons secured to the posts 4. A series of supports 16 are mounted on the carrier 14, the supports being provided with cups 17 on their upper ends, in which the fruit 18 is placed.

In the operation of the machine the carrier 14 is advanced by the rotation of the shaft 6, the fruit to be pitted being placed in the cup 17 as it advances.

The shaft 20 is journaled in bearings 21 arranged on the superstructure 5. A bevel gear 22 is fixed on the shaft 20 and meshes a bevel gear 23. The bevel gear 23 is fixed on the shaft 24. The shaft 24 is journaled in the bearings 25, the bearings being mounted on the superstructure 5 and side pieces 1. A bevel gear 26 is fixed on the lower end of the shaft 24 and meshes with a bevel gear 27. The bevel gear 27 is fixed on the shaft 6. In this way the shaft 20 is timed with relation to the shaft 6 and is driven from the pulley 8. The sprocket wheels 28 are fixed on the shaft 20 and a holder carrier 29 is driven by the sprockets 28, the carrier being guided by the guides $29^a$ secured to the post 4. The carrier 29 runs over the sprocket 30 at the opposite end of the superstructure from the sprockets 28. The sprockets 30 are mounted on the shaft 31, and the shaft 31 is journaled in bearings 32 on the superstructure.

The mountings 33 are secured on the carrier 29, pins 34 extend through the mountings 33, and the holding cups 35 are arranged on the end of pins 34. Springs 36 are arranged around pins 34 between the cups 35 and the mountings 33, yieldingly holding the cups in their outward position. Nuts 37 are arranged on the lower ends of the pins 34 and limit this outward movement.

The holding cups 35 are so positioned with relation to the carrier 29 and the cups 17 on the carrier 14 that when they are on the lower span they are brought into register with and opposed to the cups 17 so that fruit 18 placed on a cup 17 is brought between the cups 35 and 17 as the carriers on which these cups are mounted are advanced. The cups 35 being yieldingly mounted exercise a yielding pressure on the fruit so that it is securely held by these cups.

The supports 16 have pins 38 extending from them into and through the carrier 14, so that the supports 16 are rotatively mounted on the carrier. Pinions 39 are fixed on the pins 38 and a rack 40 is arranged in the path of these pinions as the carrier is advanced, the rack being supported by the guides 15. Through this mechanism when the supports reach a position to bring the pinions 39 into mesh with the rack, the further movement of the carrier moving the pinions along the rack not only advance the supports 16 and cups 17, but also rotate them so long as this engagement between the pinion and the rack continues.

A knife 41 is supported by spreaders 42, and the spreaders 42 are supported by the brackets 42ª, the brackets extending from the frame. The knives 41 are spaced apart so as to clear an interposed pit and the ends of the knives are inclined at 41ª and are slightly back of the end of the rack 40, so that when the cups 17 reach the knives the cups will be rotated under the influence of the pinion 39 and rack 40. In this way the fruit is given a rotary movement as it approaches the knife and a circular cut is made in the fruit by the knife.

As the fruit is advanced by the carrier and it passes from the knives to the spreaders 42, the guides 15 and 29ª are deflected slightly so as to be parallel with the spreaders 42. The cups 17 will follow along the lower spreader while the cups 35 will follow along the upper spreader, and as the fruit is advanced moving along the spreaders the severed parts are separated, thus exposing the pit.

The pit removing devices are as follows: A sprocket 43 is mounted on the shaft 24. A carrier 44 is driven by the sprocket 43 and runs over a sprocket 45. The sprocket 45 is mounted on shaft 46 and the shaft 46 is journaled in the bearings 47 carried by the superstructure 5 and the side piece 1. A sprocket 48 is mounted on shaft 49 at the opposite side of the machine from the shaft 24. The shaft 49 is mounted in the bearings 50, secured to the frame in any convenient manner. A bevel gear 51 is fixed on the shaft 49 and meshes a bevel gear 52 fixed on the shaft 20. The carrier 53 is driven by the sprockets 48 and runs over sprockets 54. The sprockets 54 are mounted on a shaft 55 and the shaft 55 is journaled in bearings similarly to the bearings 47.

Mountings 56 are secured to the carrier 53 at intervals. These mountings are spaced apart so as to register with the cups 17 and 35 when they are on the spans of the carriers facing inwardly in the machine. Pins 57 are slidingly mounted in the mountings 56. Cross pin shoulders 58 are arranged on pins 57. Springs 59 are arranged around the pins 57 and exert pressure against the shoulders 58. Pins 60 limit the outward position of the pins 57. The pins are provided with points 61.

In the operation of the machine, when the carriers 44 and 53 bring the points 61 into opposition they are yieldingly forced against the pits in the fruit from opposite sides. The points as they advance pass between the spreaders 42, but at a point where the spreaders are so close together that a pit carried by one of the parts of the fruit is not carried sufficiently out of the central position to be out of the path of the points. After the points have engaged the pit they advance with the cups, the parts of the peach or fruit being separated. The spreaders are sufficiently separated to permit of the passage of the pit where the carriers separate in running around the sprockets 43 and 48, a separate discharging chute or other device not shown being provided for the fruit and the pits.

In the operation of the machine the operator places the fruit on the cups 17 as they are brought to the upper part of the carrier, the fruit being preferably so placed as to make the separation as desired along the horizontal plane. As the fruit advances through the movement of the carrier 14 the holder 35 is brought yieldingly into engagement with the fruit and the holder and support then advance together, carrying the fruit into engagement with the knives 41. Just before the fruit reaches the knives 41 the pinion 39 engages the rack 40 so that the fruit is given a rotary motion as it is advanced between the knives 41, thus making the circular cut on the fruit. As the fruit is advanced the holder and the cups are slightly separated through the guides, and the fruit is moved up along the separators 42. The pitting pins 57 are carried by their carriers so that they engage the pits just as the fruit is carried on to the separators. The pins entering between the separators as the fruit is advanced and the parts are separated, the pit is retained in a central position and thus disengaged from the fruit. At the end as the carriers turn, the fruit and pits are separately discharged.

What I claim as new is:

1. In a machine of the class described the combination of a knife; a fruit support; means for giving a relative rotary movement to the support and knife about the axis of the fruit supported to give a completely circular cut to fruit on the support.

2. In a machine of the class described the combination of a knife; a fruit support; and means for rotating the support in relation to the knife and about the axis of the fruit supported to give a completely circular cut to the fruit on the support.

3. In a machine of the class described the combination of a knife; a fruit support; and means for giving a relative rotary movement to the support and knife about the axis of the fruit supported to give a circular cut to the fruit on the support; and devices for removing in a continuous operation the pit from the fruit through the opening made by the cut.

4. In a machine of the class described the combination of a knife; a fruit support; means for rotating the support relative to the knife and about the axis of the fruit supported to give a circular cut to the fruit on the support; and devices for removing in a continuous operation the pit from the fruit through the opening made by the cut.

5. In a machine of the class described the combination of a carrier; a fruit support on the carrier, the fruit on the support being advanced bodily by the carrier; means for advancing the carrier; a knife in the path of the fruit on the support adapted to act on the fruit as the carrier is advanced; and devices giving a relative rotary movement to the knife and support about the axis of the fruit supported whereby a circular cut is made in the fruit on the support as the carrier is advanced.

6. In a machine of the class described the combination of a carrier; a fruit support on the carrier, the fruit on the support being advanced bodily by the carrier; means for advancing the carrier; a knife in the path of the fruit on the support to act on the fruit as the carrier is advanced; and devices for rotating the support as the carrier is advanced, whereby a circular cut is made in the fruit on the support.

7. In a machine of the class described a combination of a carrier; a fruit support on the carrier; means for advancing the carrier; a knife in the path of the fruit on the support adapted to act on the fruit as the carrier is advanced; and devices for removing in a continuous operation the pits from the fruit through the opening made by the cut.

8. In a machine of the class described the combination of a carrier; a fruit support on the carrier; means for advancing the carrier; a knife in the path of the fruit on the support adapted to act on the fruit as the carrier is advanced; devices giving a relatively rotary movement to the knife and support whereby a circular cut is made in the fruit on the support as the carrier is advanced; and devices for removing in a continuous operation the pit from the fruit through the opening made by the cut.

9. In a machine of the class described the combination of two carriers having a portion of their path of travel adjacent; supporting cups on said carriers adapted to be brought into opposition and register as the carriers are advanced; and a pitting device acting on the fruit so supported.

10. In a machine of the class described the combination of two rotary carriers having a portion of their paths of travel adjacent; supporting cups on said carriers brought by the action of said carriers opposite to each other and in register; and a pitting device acting on the fruit so supported.

11. In a machine of the class described the combination of two carriers having a portion of their paths of travel adjacent; supporting cups on said carriers adapted to be brought into register and opposite to each other as the carriers are advanced; and a knife for opening the fruit so supported.

12. In a machine of the class described the combination of two carriers having a portion of their paths of travel adjacent; supporting cups on said carriers adapted to be brought into register and opposite each other as the carriers are advanced; a knife for opening the fruit in the path of the fruit as it is advanced by the carriers; and means for forcing the pit from the fruit so supported.

13. In a machine of the class described the combination of two carriers having a portion of their paths of travel adjacent; supporting cups on said carriers adapted to be brought into register and opposite each other by the movement of said carriers; a knife for cutting the fruit as advanced and supported by said cups; spreaders separating the parts of the fruit cut; and a device acting between the spreaders for forcing the pit from the fruit.

14. In a machine of the class described the combination of two carriers having a portion of their paths of travel adjacent; supporting cups on said carriers adapted to be brought into register and opposite each other by the advance of said carriers; a knife for cutting the fruit as it is advanced; spreaders for separating the parts of the fruit so cut; and rotary devices carrying pit forcing points operating to force the pits from the fruit as it is separated by the spreaders.

15. In a machine of the class described the combination of two carriers having a portion of their paths of travel adjacent; supporting cups on said carriers adapted to be brought into register and opposite each other by the advance of said carriers; a knife for cutting the fruit as it is advanced; spreaders for separating the parts of the fruit so cut; rotary devices carrying pit forcing points operating to force the pits from the fruit as it is separated by the spreaders; and means for actuating and timing carriers and devices.

16. In a machine of the class described the combination and means for holding and advancing fruit; a knife for cutting the fruit as it is held and advanced by the means; and a spreader separating the parts cut.

17. In a machine of the class described the combination and means for holding and advancing the fruit; a knife for cutting the fruit as it advances; a spreader for separating the parts cut and a pitting device acting on the pit as the parts are spread.

18. In a machine of the class described a support carrier; a fruit support on the carrier; a yielding holder opposite the support; a holder carrier on which the holder is mounted; means for advancing the carriers and maintaining the supports and holders in register through a portion of their paths of travel; and a knife acting on the fruit as it is advanced.

19. In a machine of the class described a support carrier; a fruit support on the carrier; a yielding holder opposite the support; a holder carrier on which the holder is mounted; means for advancing the carriers and maintaining the supports and holders in register through a portion of their paths of travel; mechanism for rotating the support as the carriers are advanced; and a knife acting on the fruit as the support is rotated.

20. In a machine of the class described the combination of a support carrier; a fruit support on the carrier; means for advancing the support carrier; a yielding holder opposite the support; a holder carrier on which the holder is mounted; means for advancing the carriers and maintaining the supports and holders in register through a portion of the paths of travel of the carriers; and a pitting device forcing the pit from the fruit so held and advanced.

21. In a machine of the class described the combination of a support carrier; a fruit support on the carrier; a yielding holder opposite the support; a holder carrier on which the holder is mounted; means for advancing the carriers and maintaining the supports and holders in register through a portion of the paths of travel of the carriers; a knife in the path of the fruit so held and advanced; and a pitting device acting upon the pit and forcing the pit from the fruit cut by the knife.

22. In a machine of the class described the combination of a support carrier; a fruit support on the carrier; a yielding holder opposite the support; a holder carrier on which the holder is mounted; means for advancing the carriers and maintaining the support and holders in register throughout a portion of the paths of travel of said carriers; a knife operating upon the fruit so held and advanced; and spreaders acting on the fruit to separate the parts cut.

23. In a machine of the class described the combination of a support carrier; a fruit support on the carrier; a yielding holder opposite the support; a support carrier on which the holder is mounted; means for advancing the carriers and maintaining the support and holders in register throughout a portion of the paths of travel of said carriers; a knife operating upon the fruit so held and advanced; spreaders acting on the fruit to separate the parts cut; and a pitting device to force the pit from the fruit so separated.

24. In a machine of the class described the combination of a support carrier; a fruit support on the carrier; a yielding holder opposite the support; a holder carrier on which the holder is mounted; means for advancing the carriers and maintaining the support and holder in register throughout a portion of their paths of travel; mechanism for rotating the support as the carrier is advanced; a knife operating on the fruit as it is rotated by the support; and a pitting device forcing the pit from the fruit so cut.

25. In a machine of the class described the combination of a support carrier; a fruit support on the carrier; a yielding holder opposite the support; a holder carrier on which the holder is mounted; means for advancing the carriers and maintaining the support and holder in register throughout a portion of their paths of travel; mechanism for rotating the support as the carrier is advanced; a knife operating on the fruit as it is rotated by the support; and a pitting device comprising a rotary carrier, an extracting point carried by the carrier, and mechanism for driving the carrier in register with the holder carrier.

26. In a machine of the class described the combination of a support carrier; a fruit support on the carrier; a yielding holder opposite the support; a holder carrier on which the holder is mounted; means for advancing the carriers and maintaining the support and holder in register throughout a portion of their paths of travel; mechanism for rotating the support as the carrier is advanced; a knife operating on the fruit as it is rotated by the support; spreaders for separating the fruit so cut; a pitting device comprising a rotary carrier; and pitting points carried by the carrier in register with the cups and operating on the pit as the fruit is separated by the spreaders.

In testimony whereof I have hereunto set my hand.

SAMUEL J. CLIFFORD.